United States Patent

[11] 3,577,798

[72] Inventor  Michel Guettier
              Billancourt, France
[21] Appl. No. 817,111
[22] Filed     Apr. 17, 1969
[45] Patented  May 4, 1971
[73] Assignees Regie Nationale Des Usines Renault
              Billancourt, Hauts de Seine, France;
              Automobiles Peugeot
              Paris, France
[32] Priority  Apr. 22, 1968
[33]          France
[31]          148934

[54] HAND BRAKE CONTROL MECHANISMS
    5 Claims, 1 Drawing Fig.
[52] U.S. Cl. .................................................. 74/503,
                                                          74/502
[51] Int. Cl. .................................................. G05g 1/00
[50] Field of Search .................................... 74/537,
                                                    538, 502, 503

[56]              References Cited
             UNITED STATES PATENTS
2,158,323  5/1939  Ericson et al. .................  74/503

| 2,177,456 | 10/1939 | Irving .......................... | 74/502 |
| 2,271,799 | 2/1942  | McCarthy ..................... | 74/502 |
| 2,587,390 | 2/1952  | Schweitzer ................... | 74/503X |
| 2,591,495 | 4/1952  | Baldwin, Jr. et al. ......... | 74/538X |
| 2,598,133 | 5/1952  | Roesch ........................ | 74/503 |
| 2,607,239 | 8/1952  | Weber .......................... | 74/537 |
| 2,635,481 | 4/1953  | DeOrlow ..................... | 74/503 |
| 2,928,292 | 3/1960  | Hirst, Jr. ...................... | 74/503 |

Primary Examiner—Milton Kaufman
Assistant Examiner—F. D. Shoemaker
Attorney—Stevens, Davis, Miller & Mosher ABSTRACT: A handbrake control mechanism having a control member slidably mounted in a slideway guide and connected to the brake control cable. The control member has a tubular body with a handgrip and countergrip at one end, several longitudinal slits, a retaining member constituted by a spring biased pawl pivoted on a pivot pin carried by a shuttle inside the tubular body and operatively connected to the countergrip by a rod. The slideway-guide is cylindrical and has a rack formed along one side to coact with the pawl when the brake is set. A brake cable is connected to the shuttle.

Patented May 4, 1971 3,577,798
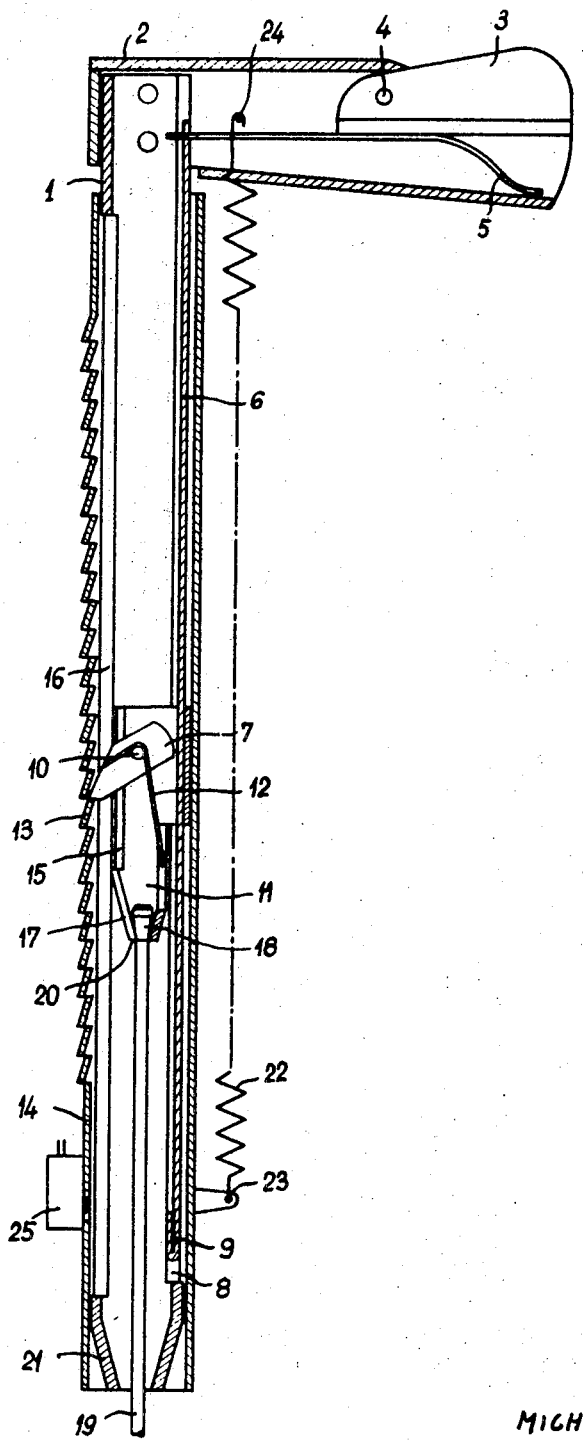
INVENTOR
MICHEL GUETTIER
By Stevens, Davis, Miller & Mosher
ATTORNEYS

HAND BRAKE CONTROL MECHANISMS

The present invention relates in general to handbrake control mechanisms for automotive vehicles and more particularly to a brake control device incorporating a grip lever collapsible in both brake-on and brake-release positions.

Handbrake control mechanisms are already known which comprise two elements in mutual sliding engagement, having a control or grip lever adapted when pulled to move a pawl against an antagonistic force, said pawl engaging the teeth of a guide rod or a ratchet member.

The main drawback characterizing these known devices lies in the fact that it is difficult to grip the control lever or handle without abnormally leaning forwards and/or sidewise for applying the brake or fully releasing same. This is due to the fact that when the brake is applied the control lever or grip handle project somewhat into the passenger space and may under certain circumstances interfere with the legs of front seat passengers stepping into or out from the vehicle; therefore, this control lever and brake mechanism should be located as remotely as possible within the passenger space.

It is the object of the present invention to provide a handbrake control mechanism adapted to avoid the inconvenience set forth hereinabove and which is designed more particularly for being installed in the passenger space within easy reach of the driver's hand so that it can be operated with the maximum safety even by a driver retained on his seat by a safety belt. On the other hand, this mechanism is provided with a unique safety feature against undesired or untimely brake release.

This handbrake control mechanism comprises a retaining member held in its operative position by a guide member against a release force and cannot be released unless it is relieved beforehand of at least part of its load by a control member or actuator. The control member or actuator coacts with a retaining member which is movable about a pivot pin, against the release force and unidirectionally along a certain distance, and acts against the independent-action return force of a resilient member.

The control member of the handbrake control mechanism according to this invention is advantageously actuatable by means of a handgrip and countergrip both collapsible or retractable when the manual action exerted thereon is discontinued. The operative or inoperative brake position is signalled on the instrument panel of the vehicle by a tell-tale lamp.

A preferred form of embodiment of the brake control mechanism according to this invention will now be described with reference to the attached drawing of which the single figure illustrates diagrammatically in vertical axial section this mechanism in its operative condition.

The control member or actuator of the handbrake control mechanism consists of a lever 1 having a tubular body along most of its length and provided at its outer end with a fixed hand grip 2, the brake release being controlled by a countergrip or push member 3 associated therewith. To this end the countergrip 3 is pivoted at 4 to said handgrip and adapted to actuate, by means of a spring blade 5, a rod 6 for unlocking a pawl 7. The rod 6 rigid with one end of said spring blade 5 is received in a slot 8 of tubular lever 1 and its opposite end 9 is bent 180°, as shown.

The pawl 7 is fulcrumed to a pivot pin 10 carried by a cylindrical shuttle 11 in which said pawl is housed, said shuttle 11 being adapted to slide within the tubular control lever 1 and along its slot 8. A longitudinal aperture is provided to permit the passage of said rod 6 through the shuttle 11. Furthermore, a suitable spring 12 constantly urges the operative end of pawl 7 into the cavity formed between two adjacent teeth 13 of a fixed slideway-guide and rack member 14 surrounding said control lever 1. A slot 15 formed in said shuttle 11 and another slot 16 formed in said lever 1 permit the movement of pawl 7. The shuttle 11 has a frustoconical lower end 17 permitting anchoring therein the reinforced end 18 of handbrake control cable 19. This cable 19 extends through the lower orifice 20 of shuttle 11 and then along the interior of the control member 1 formed with a tapered lower end 21.

A traction spring 22 having one end anchored to the slideway-guide member 14 and the other end 24 attached to the hand grip 2 constantly urges the control lever 1 to its inoperative position.

The handbrake control mechanism described hereinabove operates as follows:

In the inoperative or brake-release position the male tapered end 17 of shuttle 11 engages the female tapered end 21 of tubular control lever 1.

To apply the hand brake the driver pulls the hand grip handgrip 2. The lever 1 sliding in the slideway-guide and rack member 14 will thus carry along the shuttle 11. This shuttle 11, by freeing the passage hole provided for an electric switch 25, actuates this switch 25, thus energizing the tell-tale lamp (not shown) on the instrument panel of the vehicle. When the driver feels that the hand brake is properly and sufficiently applied, he stops the movement of handgrip 2; thus the spring 12 will push the pawl 7 against one tooth 13. On releasing the handgrip lever, the latter is urged by traction spring 22 to its inoperative position, and the mechanism is then in the position shown in the drawing.

To release the brake the driver pulls the handgrip 2 until the tapered end 21 of control lever 1 engages the tapered end 17 of shuttle 11. By actuating the countergrip 3 the pawl is retracted completely as it is moved by the control rod 6, whereafter it is only necessary to axially move the handgrip 2, while keeping the countergrip or push member 3 depressed, in order to cause the assembly, pulled by cable 19 and spring 22, to resume its inoperative position. As it stops in front of switch 25, the pawl 7 actuates this switch so that the tell-tale lamp on the instrument panel is put out automatically.

I claim:

1. A handbrake control mechanism comprising a hollow side slideway guide member and a control member slidably received in said slideway guide member; said control member comprising a tubular body having a handgrip and a countergrip at one end, several longitudinal slits formed in said tubular body, a shuttle movably mounted in said tubular body, rod means operatively connecting said shuttle to said countergrip through one of said slots, and a retaining member comprising a pivot pin carried by said shuttle and a spring biased pawl pivotally mounted on said pivot pin with one end extending through another of said slots; said slideway guide member having a rack formed along one side to coact with said pawl; and a brake operating cable connected to said shuttle.

2. A handbrake control mechanism according to claim 1 further comprising spring means biasing said countergrip to such position that when said handgrip is pulled to actuate the brake said pawl engages said rack to prevent relative movement between said shuttle and said slideway guide member and when said countergrip for releasing the brakes, said spring means brings said rod means into contact with said pawl to disengage the latter from said rack.

3. A handbrake control mechanism according to claim 1 further comprising a tapered portion formed on the end of said tubular body opposite said handgrip, and a corresponding taper formed on one end of said shuttle.

4. A handbrake control mechanism according to claim 1 further comprising tension spring means connecting said control member and said guide member and serving to retract the former member into the latter member upon release of the handgrip.

5. A handbrake control mechanism according to claim 1 further comprising electric switch means mounted on said rack and adopted to be actuated by movement of said shuttle and to control energization of a brake signal light.